July 28, 1953     C. A. DYER     2,647,155
PRIMARY ELECTROLYTIC CELL OR GROUP OF CELLS
Filed July 29, 1949     2 Sheets-Sheet 1
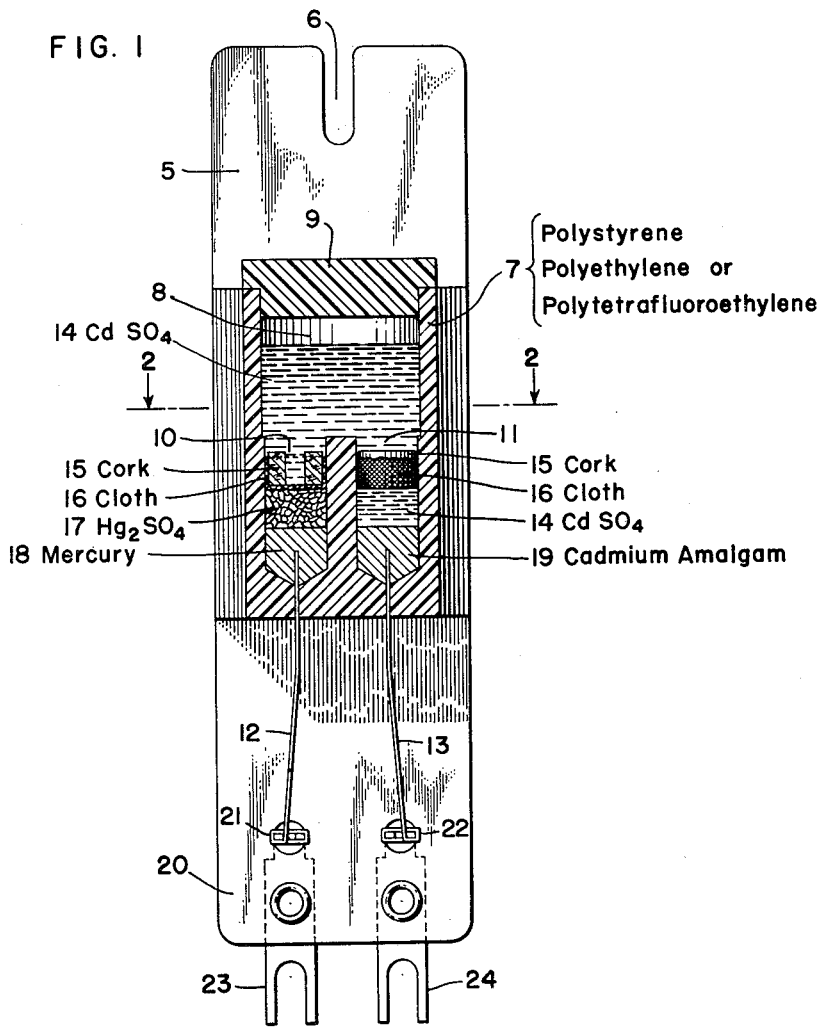
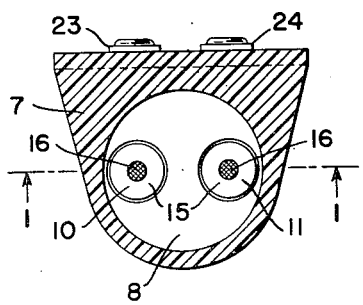
INVENTOR.
CLARENCE A. DYER
BY
ATTORNEY.

July 28, 1953 C. A. DYER 2,647,155
PRIMARY ELECTROLYTIC CELL OR GROUP OF CELLS
Filed July 29, 1949 2 Sheets-Sheet 2

*INVENTOR.*
CLARENCE A. DYER
BY
*Arthur H. Swanson*
ATTORNEY.

Patented July 28, 1953

2,647,155

UNITED STATES PATENT OFFICE 2,647,155

PRIMARY ELECTROLYTIC CELL OR GROUP OF CELLS

Clarence A. Dyer, Glenside, Pa., assignor to Minneapolis-Honeywell Regulator Company, Minneapolis, Minn., a corporation of Delaware Application July 29, 1949, Serial No. 107,556

2 Claims. (Cl. 136—88)

Modern technology demands ever increasing accuracy. To meet these demands, more exact reference standards are required. One such reference standard is the primary electrolytic cell of the Weston type which is used to provide a voltage standard for potentiometric work. Such cells have a certain degree of temperature sensitivity.

One object of this invention is to provide a group or plurality of such cells the different poles of which are located as close together as possible so as to be at substantially the same temperature. Such close physical spacing of the poles or of the cells themselves provides good thermal stability.

A further object of this invention is to provide a group or battery of standard cells in which the different pole portions are enclosed within a metal cover which tends to equalize the temperature at each pole portion.

Yet another object of this invention is to provide a standard cell having a casing which can be economically and efficiently manufactured of plastic material combining high resistance to deterioration due to electrical or chemical causes.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Each of the figures is a cross section on the line indicated as viewed in the direction of the arrows.

Fig. 1 is a vertical cross section on line 1—1 of Fig. 2 showing a single cell.

Fig. 2 is a horizontal cross section on line 2—2 of Fig. 1.

Figure 3:
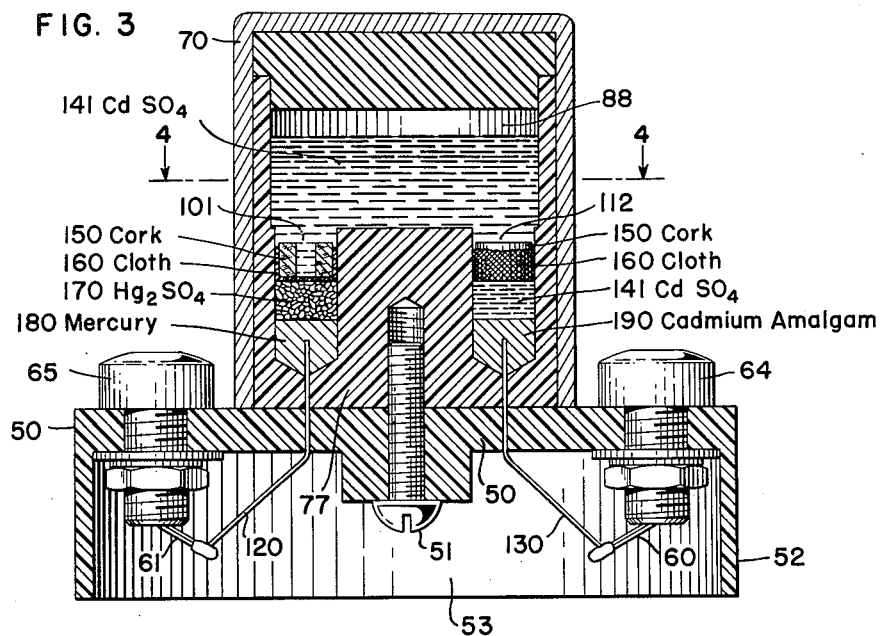
Fig. 3 is a vertical cross section on line 3—3 of Fig. 4 showing a group of cells.

Figs. 1 and 2 show a standard cell having a case or container formed of a suitable plastic such as polystyrene, polyethylene or polytetrafluoroethylene. This casing or container consists of a backing or upper plate 5 having a notch or opening 6 in its upper end. Projecting forwardly from backing 5 is a substantially cylindrical, hollow portion 7 in which is a cavity 8 closed at its upper end by an integrally united cap 9.

Cavity 8 has projecting from the lower portion thereof two smaller recesses, generally indicated at 10 and 11. A positive lead 12, of platinum or the like, communicates with the bottom of the positive leg or pole portion in recessses 10. Similarly, a negative lead 13 communicates with the bottom of the negative leg or pole piece in the recesses 11. Leads 12 and 13 may be inserted in casing 7 by being heated and passed through the wall of the casing 7. The wall of the casing cools around the leads 12 and 13 and seals to form a fluid-tight joint. Electrolyte 14, consisting of cadmium sulphate ($CdSO_4$), is placed in a cavity 8 before cap 9 is secured in position and passes down through perforations in corks 15 which are located in the positive and negative pole portions 10 and 11. Electrolyte 14 may be saturated or unsaturated. Corks 15 are surrounded at their bottom and sides with a layer of cloth 16, conveniently of linen. The cork and cloth in recesses 10 are shown in vertical cross section while the cork and cloth in recess 11 are shown in side elevation. In the positive recess 10 is a layer of mercurous sulphate paste 17 ($Hg_2SO_4$). Surrounding the upper end of positive lead 12 is a body of pure mercury 18.

In negative recess 11 is a layer 14 of cadmium sulphate and, surrounding the upper end of negative lead 13, is a bead 19 of cadmium amalgam.

Also secured to case 7 is a lower back 20 supporting pole pieces 21 and 22, which pass through it and each of which is attached at one end to the lower end of positive lead 12 or negative lead 13. Terminals 23 and 24 are secured on the rear of lower back 20 and have connection with pole pieces 21 and 22 and project beneath the lower back 20 so as to afford connection for wires to a potentiometer or the like.

This primary cell has a positive electrode consisting of the active material formed by the layer of mercurous sulphate paste 17, and the body of mercury 18, the lead 12, the pole piece 21, and the terminal 23. The negative electrode consists of the active material comprising the bead 19 of cadmium amalgam, the lead 13, the pole piece 22, and the terminal 24.

Figure 4:
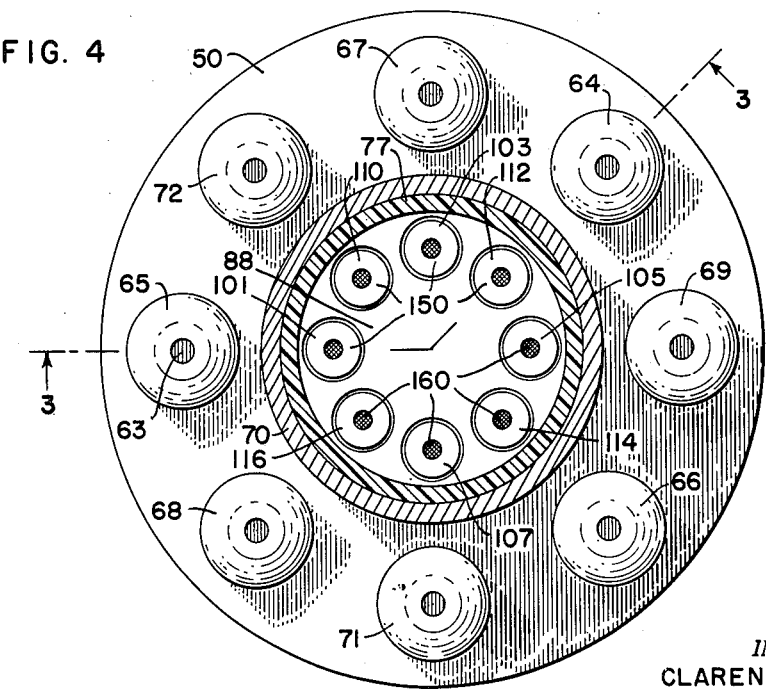
Fig. 4 is a horizontal cross section on line 4—4 of Fig. 3.

Figs. 3 and 4 show a plurality of cells, similar to the cell just described, grouped around a common reservoir. In this modification, the container 77 has a cavity 88 in it in which is located a body 141 of electrolyte of cadmium sulphate. As is best seen in Fig. 4, the bottom of cavity 88 has a plurality of smaller recesses 101, 103, 105 and 107 communicating with it. Also communicating with cavity 88 are a second plurality of recesses 110, 112, 114 and 116. The odd numbered recesses form positive legs while the even numbered recesses form negative legs. For example, cavity 101 contains a perforated cork 150 surrounded by a cloth layer 160 beneath which is a layer of mercurous sulphate 170 and a pool of mercury 180 engaging with the end of positive lead 120.

A base 50 is secured to container 77 as by a screw 51 and has a flanged edge or rim 52 forming a cavity 53 in the bottom thereof in which the electrodes are located.

The outer or free end of lead 120, for example, is secured to a terminal wire 61 forming a portion of a terminal having a central opening 63 formed in a body 65 of insulation.

The recess 112, which forms one of the negative legs or pole pieces, contains a cork 150 surrounded by a cloth 160 and a layer of cadmium sulphate 141 above a body of cadmium amalgam 190 which engages with the inner end of negative lead 130.

Negative lead 130 is secured at its outer end to a terminal wire 60 which forms part of a terminal having an opening 62 formed in a body 64 of insulation.

The odd numbered, positive terminals 65, 67, 69 and 71 may be differently colored or otherwise distinguished from the even numbered, negative terminals 64, 66, 68 and 72.

This plurality of primary cells has, for example, positive electrodes consisting of the active material comprising a layer of mercurous sulphate 170 and the pool of mercury 180, the lead 120, the terminal wire 61, and the terminal to which wire 61 is attached. The negative electrodes comprise, for example, the body of cadmium amalgam 190, the lead 130, the terminal wire 60, and the terminal to which the wire 60 is connected.

In order to maintain the positive and negative pole portions at as nearly the same temperature as possible, the casing 77 is surrounded with a cover 70 of inverted cup-shape of metal of good thermal conductivity, such as aluminum or copper. Any positive recess may be connected with any negative recess to form a standard cell by connecting an odd numbered terminal with an even numbered terminal. Thus, this device provides a plurality of standard cells maintained at substantially the same temperature and giving an extremely accurate reference of voltage.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. A group of standard primary cells including, a closed hollow body of a plastic selected from the class consisting of polystyrene, polyethylene or polytetrafluoroethylene and having a cavity therein and a plurality of smaller separate recesses each communicating individually with said cavity, an electrolyte of a solution of cadmium sulphate in said cavity and in said recesses, a plurality of bodies of mercurous sulphate each located in an alternate one of said recesses to form positive pole portions, positive electrodes each communicating at one end with one of said bodies of mercurous sulphate, and a plurality of negative electrodes each communicating at one end with the electrolyte in one of the recesses intermediate said alternate recesses containing mercurous sulphate.

2. A group of standard primary cells including, a closed hollow body having a cavity communicating with a plurality of separate recesses therein, said body being composed of a plastic selected from the class consisting of polystyrene, polyethylene or polytetrafluoroethylene, chemically active voltage producing materials in said recesses in the cavity in said body, and a cover of inverted cup shape surrounding the hollow and the recesses in said body and composed of metallic material of good heat-conductivity to equalize the temperature in each of said recesses.

CLARENCE A. DYER.

References Cited in the file of this patent

UNITED STATES PATENTS

| Number | Name | Date |
| --- | --- | --- |
| 439,737 | Weston | Nov. 4, 1890 |
| 494,827 | Weston | Apr. 4, 1893 |
| 2,153,152 | Mucher | Apr. 4, 1939 |
| 2,176,427 | Kershaw | Oct. 17, 1939 |
| 2,349,763 | Setzer | May 23, 1944 |
| 2,400,094 | Benning | May 14, 1946 |

FOREIGN PATENTS

| Number | Country | Date |
| --- | --- | --- |
| 217,685 | Germany | Feb. 20, 1909 |

OTHER REFERENCES

Richards, Carnegie Inst. Publ. 118 (1909), pages 15, 16.